Inventor
W. G. Cox

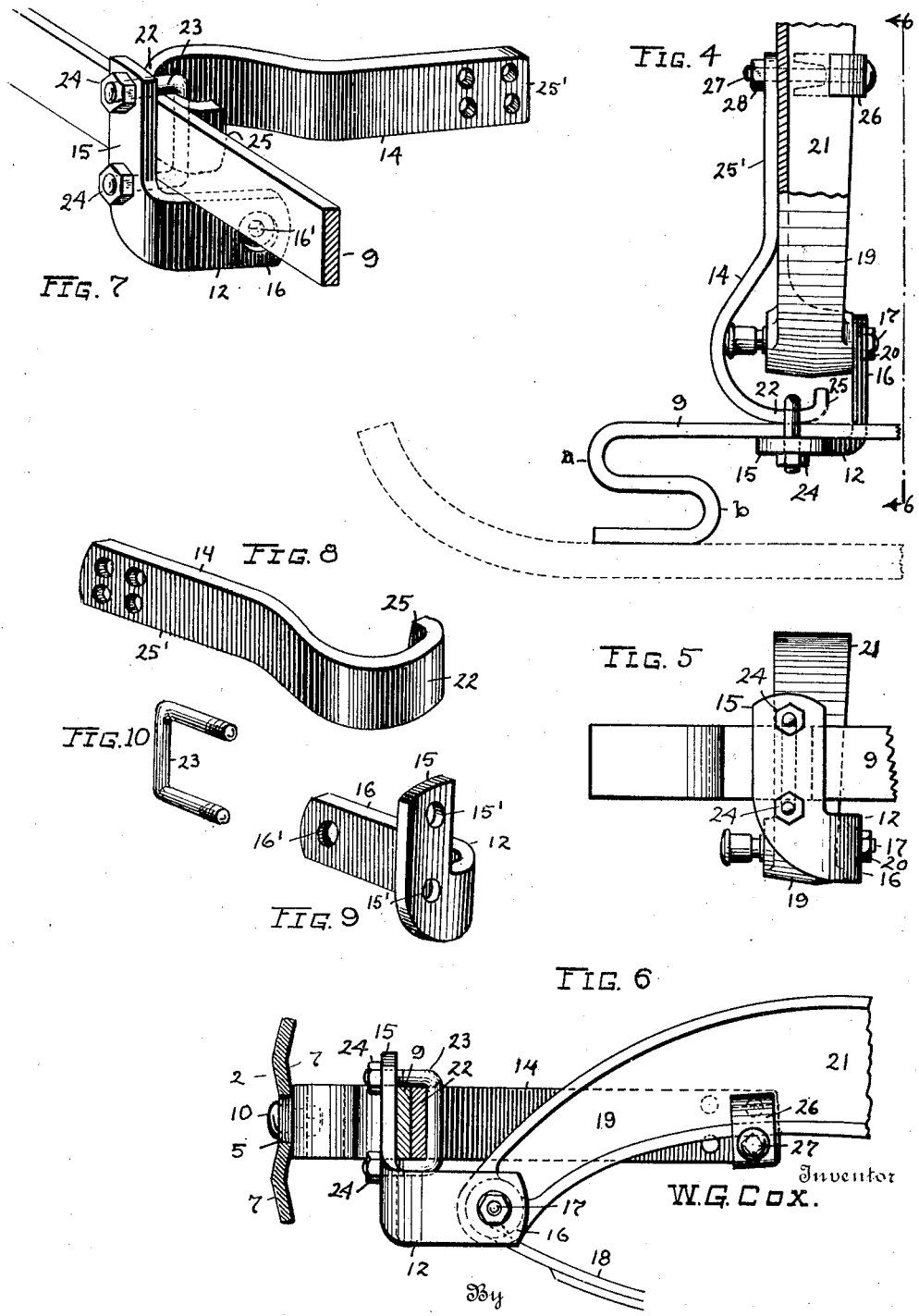

Patented June 12, 1923.                                              1,458,276

UNITED STATES PATENT OFFICE.

WILLIAM G. COX, OF CLEVELAND, OHIO.

VEHICLE FENDER.

Application filed February 5, 1923. Serial No. 616,972.

*To all whom it may concern:*

Be it known that I, WILLIAM G. Cox, a citizen of the United States, residing at Cleveland, in the county of Cuyahoga and State of Ohio, have invented certain new and useful Improvements in a Vehicle Fender, of which the following is a specification.

The present fender is an improvement in that class of fenders which extend transversely opposite end portions of an automobile and attach to the shackle bolts for the leaf springs supporting the frame and body. In general, my objects are to provide a relatively broadfaced rigid plate fender adapted to ward off shocks and protect the finished surface and other parts of the car subject to be affected injuriously in collisions; to provide a spring bar adapted to cushion and lessen the shock imparted to the impact members or plate; and to provide supporting brackets adapting the fender to be readily attached to automobiles of varying width, the said brackets being made sectional and especially designed to clamp the bar between the respective sections thereof by means of nuts and a U-bolt, all as hereinafter shown and described and more particularly pointed out in the claims.

Figure 1:
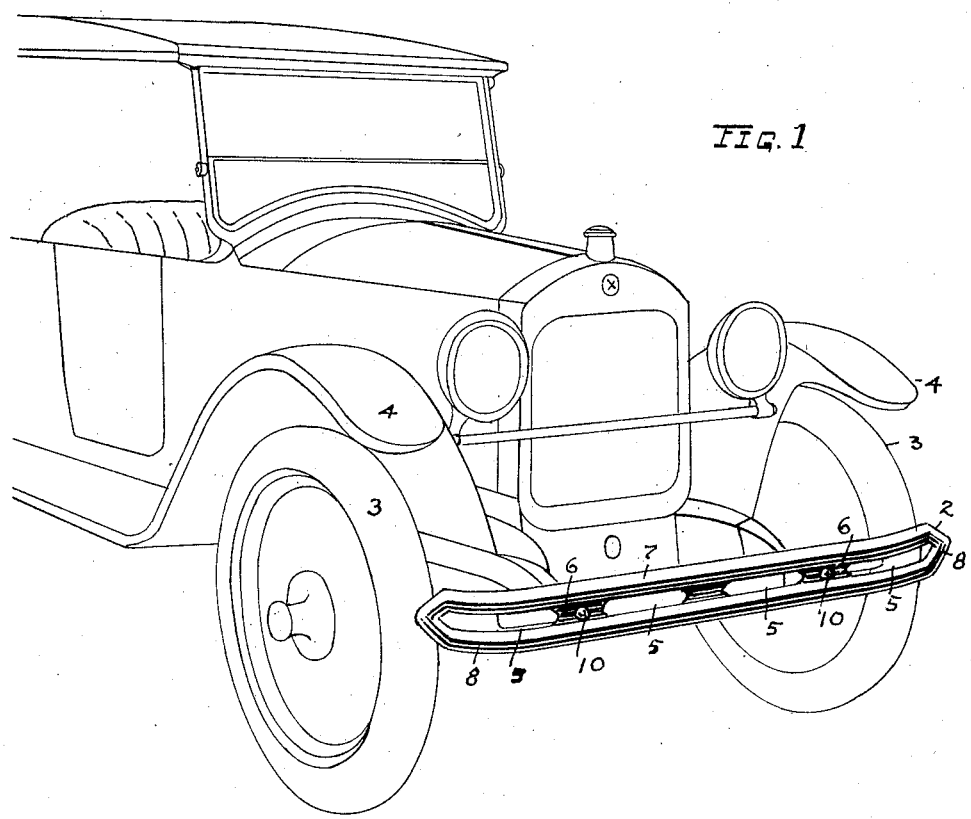
Figure 2:
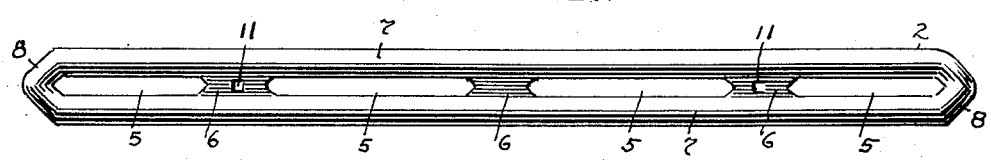
Figure 3:
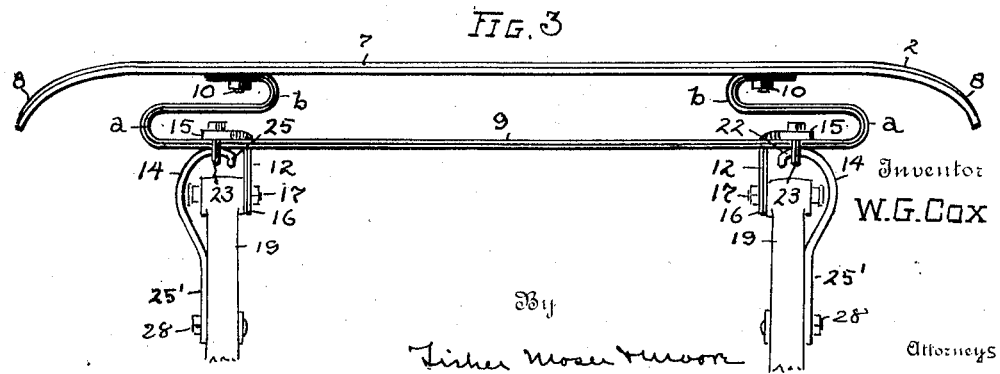

In the accompanying drawing, Fig. 1 is a perspective view of an automobile equipped with my improved fender, Fig. 2 is a front elevation of the fender plate. Fig. 3 is a top view of the complete fender mounted upon the projecting extremities of an automobile. Fig. 4 is an enlarged top view of one bracket assembly such as shown in Fig. 3, and Fig. 5 is a front view of the same parts. Fig. 6 is a side elevation of the bracket and frame parts shown in Fig. 4, viewed from line 6—6, but showing one of the bracket pieces and the spring bar and the fender plate in cross section. Fig. 7 is a perspective view of a bracket assembly supporting a bar, and Figs. 8, 9 and 10 similar views of the several pieces constituting a complete clamping bracket.

The fender comprises an impact member 2 in the form of a metal plate of substantial thickness and strength which is relatively as long as the vehicle is wide so that the opposite ends of the plate may extend opposite the wheels 3 and their guards 4. A series of elongated openings 5 are formed on the horizontal medial line of this plate, which openings are separated by integral webs 6, and the imperforated portion 7 bordering these openings is slightly dished or beveled obtusely toward the inner and outer edges of the plate. The opposite ends 8 of the plate may be rounded or tapered, but preferably bluntly pointed on angular and rounded lines as shown in Fig. 2. Ends 8 are also preferably bent rearwardly on curved or slanting lines, which taken with the beveled and perforated formation described, gives the fender a distinctive and pleasing appearance. However, the primary function of the beveled and slanting impact portions and surfaces is to strengthen the fender and make it more resistant to shocks and blows and also to deflect and fend off objects striking the fender. It is also desirable to cushion the force of impacts and blows on plate 2, and I therefore secure said plate detachably upon a flat or corrugated metal bar 9 having its opposite ends bent reversely into S shape to provide reversely-related elongated loops *a* and *b*, respectively, which are doubly resilient because of the double bends formed therein and the inherent resilience in the flat bar standing edge upward in the horizontal plane. Under pressure upon the impact member the spring loops are compressed and deflected toward the rear bar 9 and the car, and if this pressure is continued the resistance increases until loop *b* eventually bears against or seats upon the bar and with a possible further yield in loop *b* itself under severe impacts and blows; this result may occur regardless of whether the blow is delivered on the impact member opposite the loops, or centrally between the ends of said member, thereby cushioning the fender uniformly as a whole.

In the present instance plate 2 is secured to the straight end of spring loops *b* by means of nuts and bolts 10, the bolts passing through openings 11 in webs 6 of the plate, and bar 9 is supported by a pair of brackets, each made in two parts or pieces 12 and 14 rigidly secured to the automobile, and each other by suitable clamping devices. Thus, referring to Figs. 4 to 10, inclusive, each bracket piece 12 comprises a short flat bar bent in the flat at right angles at about its middle and also bent edgewise at right angles adjacent the flat bend to provide a straight vertical arm 15 at the front end of a horizontal arm 16, the two arms presenting flat vertical faces in different vertical planes at right angles to each other. Vertical arm 15 has a pair of spaced bolt openings 15' vertically aligned therein, and horizontal arm 16 has a single bolt opening 16' in its face near its rear end. The shackle bolt 17 for the vehicle suspension spring 18 projects sufficiently to enter into opening 16' in bracket member 12 so that this member may be clamped against the body supporting part 19, the single bolt 17 and its nut 20 serving to secure the bracket member and the vehicle spring jointly in place at their common place of connection with part 18, which part or its equivalent turns downwardly in most types of automobiles and forms the extremity of one of the side channel bars 21 of the chassis frame. The other bracket member 14 is also formed of a bar or strip of metal, but this bar is merely bowed in its flat surface or bent laterally at one end to provide a transverse clamping portion 22 which may extend opposite and behind the vertical arm 15 of the other bracket member 12 when the two pieces are attached to the vehicle and clamped on opposite sides of supporting bar 9 of the fender. A clip or yoke member in the form of a U-bolt 23 straddles the bar and the hook-shaped end of bracket member 14 and the two legs of the bolt pass through openings 15' in the vertical arm of the other member 12, a tight but detachable connection being obtained by nuts 24 screwed upon the legs against the front face of arm 15. A short rearwardly-bent lip 25 at the extremity of the clamping portion 22 prevents the U-bolt from slipping free if the parts become loose, and a straight shank 25' having one or more bolt openings therein forms the rear end of member 14 to permit it to be clamped tightly against the outer flat side of channel bars 21 by means of a clip 26, bolt 27 and a nut 28, or their equivalents. When both sections of a bracket are clamped to bar 9 and to the vehicle the sections 12 and 14 brace each other and make a rigid and stable support for the fender, and the bar may be engaged and clamped at any place more or less remotely from its looped S-shaped ends so that the fender may be readily attached to cars of any width. When the bracket is attached to the car the straight member 14 extends forward horizontally from the car in a higher plane than the short arm 16 of angle member 12 which connects with shackle bolt 17, thus permitting the fender supporting bar 9 to be engaged at its rear side by the wide vertical face of transverse portion 22, directly opposite the vertical clamping arm 15' of member 15, and also permitting attachment of the respective members 12 and 15 at higher and lower elevations to the car where slanted or curved downwardly, as at its extremities or parts 19.

What I claim, is:

1. A fender for an automobile, comprising a supporting bar having looped spring extremities, and an impact plate fixed to said spring extremities having a series of elongated openings therein and beveled adjacent said openings.

2. A fender for an automobile, comprising a relatively long and wide impact plate having parallel beveled impact surfaces extending longitudinally thereof, and supporting means fixed to the rear side of said plate.

3. A fender for an automobile, comprising an impact plate having parallel reversely-beveled impact portions above and below its longitudinal medial line, and supporting means for said plate.

4. A fender for an automobile, comprising an impact plate having reversely-beveled border portions and openings lengthwise thereof and connecting webs for said border portions, and supporting means affixed to said connecting webs.

5. A fender for automobiles, comprising a bar, and a pair of clamping brackets each bracket comprising a straight attachment member bent transversely to engage the rear side of said bar and an angular attachment member having a vertical arm to engage the front side of the bar, and a yoke member to clamp said parts rigidly together.

6. A fender for automobiles, comprising a bar, and a pair of clamping brackets, each bracket comprising a flat piece of metal having a straight shank at one end and a transverse bend at its opposite end and a second flat piece of metal having a short horizontal arm with a bolt opening therein and a vertical arm with spaced bolt openings therein, and a yoke member adapted to extend through said spaced openings in said vertical arm in straddling clamping relation with said first piece and said bar.

7. A fender bracket for automobiles, comprising two flat pieces, one of said pieces having a straight shank adapted to be clamped to one side of a frame part of the automobile and bowed and bent transversely in its flat surface at its front end to provide a horizontal clamping extremity, the other of said flat pieces having a short horizontal arm provided with an opening adapted to receive the shackle bolt for the suspension spring of the automobile and to permit said arm to be clamped to the same frame-part aforesaid and having a vertical clamping arm angularly-related to said horizontal arm and adapted to project upwardly opposite the horizontal clamping extremity of said first piece, and means associated with said pieces adapted to clamp a flat fender member rigidly between their respective front clamping extremities.

8. A fender bracket for automobiles, comprising a straight bar having a flat perforated shank at one end and a transverse clamping extremity at its opposite end terminating in a rearwardly-extending lip, and a second flat bar bent laterally in its flat surface and thence edgewise and upwardly to provide angularly related horizontal and vertical arms in different vertical planes, the horizontal bar having an opening therein adapted to receive the shackle bolt for a suspension spring of the automobile and the vertical arm having bolt openings at different elevations therein to permit a clamping connection to be made with said first bar in a higher horizontal plane than the horizontal arm for said shackle bolt.

9. A fender for an automobile comprising an impact plate of stamped sheet metal having laterally extending corrugations, and resilient shock-absorbing supports fixed to the rear of said plate.

In testimony whereof, I affix my signature hereto.

WILLIAM G. COX.